United States Patent
Goldstein

[15] 3,679,289
[45] July 25, 1972

[54] CRYSTAL LIGHT MODULATOR PROVIDING BOTH APERTURE AND INTENSITY CONTROL

[72] Inventor: Robert L. Goldstein, 7 Reading Terrace, Fair Lawn, N.J. 07410

[22] Filed: Aug. 24, 1970

[21] Appl. No.: 66,527

[52] U.S. Cl.................................350/150, 350/160
[51] Int. Cl..................G02f 1/26, G02f 1/28, F02f 1/36
[58] Field of Search.................................350/150, 160

[56] References Cited

UNITED STATES PATENTS

| | | | |
|---|---|---|---|
| 3,554,632 | 1/1971 | Chitayat | 350/150 |
| 2,983,786 | 5/1961 | Rogers | 350/150 |
| 3,409,781 | 11/1968 | Immarco et al. | 350/150 |
| 3,229,223 | 1/1966 | Miller | 350/150 |
| 2,467,325 | 4/1949 | Mason | 350/150 |
| 3,392,353 | 7/1968 | Miller | 350/150 |

FOREIGN PATENTS OR APPLICATIONS

| | | | |
|---|---|---|---|
| 1,173,033 | 12/1969 | Great Britain | 350/150 |

OTHER PUBLICATIONS

G. D. Burnett, " Light Modulation with Piezolectric Crystals," Electronic Industries, 11/62, Vol. 21, 011, pp. 90- 95.

*Primary Examiner*—Ronald L. Wibert
*Assistant Examiner*—Jeff Rothenberg
*Attorney*—Alfred W. Barber

[57] ABSTRACT

A Pockels Cell provided with annular electrodes provides intensity control of a light beam or an aperture control depending on the geometry. Two cells may be combined to provide control of both beam size and intensity.

5 Claims, 9 Drawing Figures

PATENTED JUL 25 1972

INVENTOR.
ROBERT L. GOLDSTEIN

BY *Alfred W. Barber*

ATTORNEY

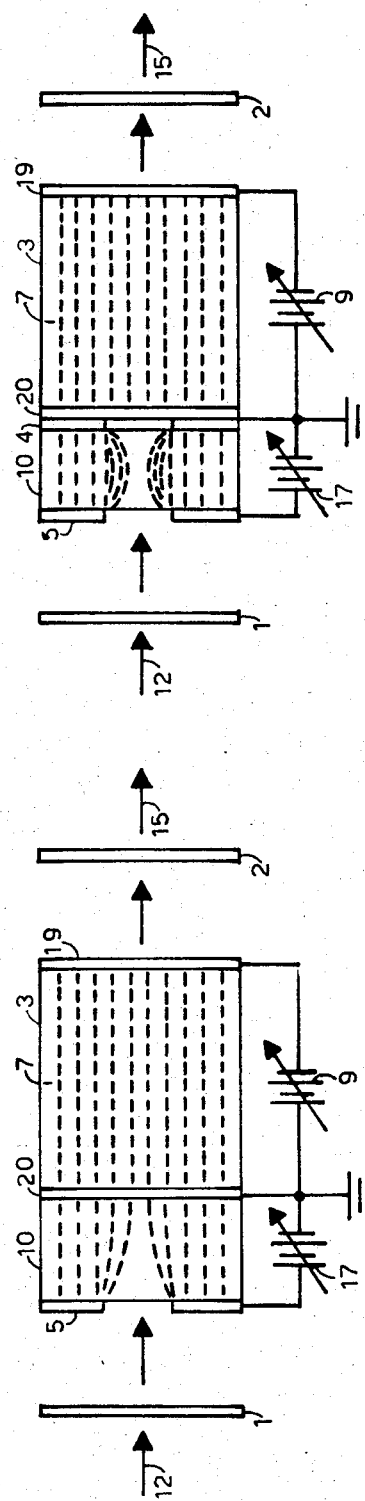
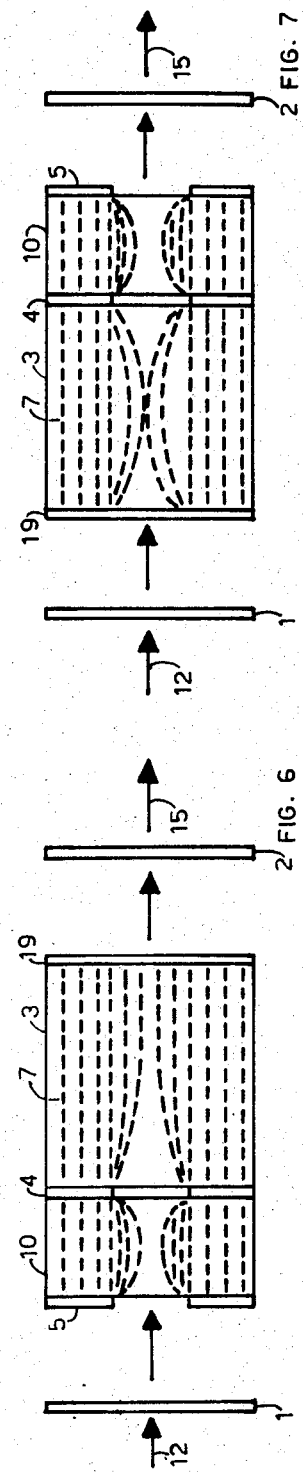
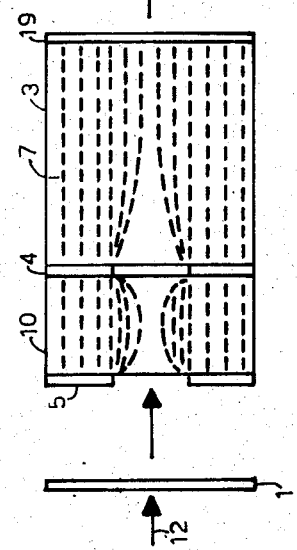

CRYSTAL LIGHT MODULATOR PROVIDING BOTH APERTURE AND INTENSITY CONTROL

A number of crystal materials possess electro-optic properties which produce changes in light passing through them when an electric field is applied. The Pockels Cell uses an electric field applied in the direction of the optic axis of the crystal to cause phase retardation of the electric vectors of the light wave with a corresponding rotation of the plane of polarization of the transmitted light. If the incident light to the cell is passed through a polarizing screen and the emitted light is passed through an analyzer screen, the cell will effectively control the quantity of light leaving the analyzer. The operation of such a modulator is described in detail in an article entitled "Pockels Cell Primer" by Robert Goldstein and published in Laser Focus Magazine, Feb. 1968 issue. Of the six crystals named in the article, ADP (ammonium dihydrogen phosphate), KEP (potassium dihydrogen phosphate), and KD*P (potassium dideutrium phosphate) seem to be the most useful in Pockels Cells when cost, availability and performance are taken into consideration. For purposes of explanation of the present invention crystals of KDP will be described although the invention may be practiced with other crystals which meet the particular design considerations. Such crystals may be the above isomorphs of KDP or may be from different crystals classes. Typical of these are Cuprous Chloride, Lithium Niobate, Lithium Tantalate, Barium Sodium Niobate.

In the past Pockels Cells have been used merely to modulate or control light intensity. This may be accomplished by using transparent electrically conducting electrodes on the crystal of KDP, for example, or by using annular electrodes and making the crystal 30 percent or more greater in thickness (along its optic axis and direction of the applied electric field) than the diameter of the hole in the annular electrodes. Another electrode form is the electron lens type which is applied as rings around the circumference at both ends of a cylindrical crystal. This electrode configuration is fully interchangeable with the annular type but requires that a cylindrical crystal of somewhat longer length be used to prevent voltage breakdown between the rings. In contrast, use of annular electrodes permits the use of thinner crystals of various geometry since these electrodes are placed on opposing ends of the crystal which provides voltage insulation by its presence.

Summary:

In accordance with the present invention a crystal cell is provided which controls the size of the beam of light as, in effect, a variable aperture. This is accomplished by making the crystal thickness, in the direction of its optic axis and the applied electric field, small enough with respect to the size of the hole in the annular electrodes to cause the electric field to fringe to a substantial degree producing a variable rotation of the plane of polarization over the light beam cross section as it passes through the crystal. The result is to reduce the effective size of the light beam leaving the device.

In one modified form of the present invention, a thin crystal modulator providing control of beam size is combined with a thick crystal modulator providing control of the beam intensity so that both beam size and beam intensity can be controlled independently or in concert. Various combinations are possible such as two cells, one thin and one thick with a common annular electrode between the two, a second annular electrode on the outside surface of the thin cell and a third annular electrode on the outside surface of the thick cell; or the same combination but with the third annular electrode replaced by a flat transparent electrode; or a combination of one annular electrode on the outside surface of the thin cell, a flat transparent common electrode and a similar electrode on the outside of the thick cell. These and some of the other possible combinations will be described in detail below in connection with the various figures of the Drawing.

In the Drawing:

FIGS. 3, 4, 5, 6 and 7 are side views of various combinations of thin and thick Pockels Cells in accordance with the present invention.

FIG. 8 is a graphical illustration of the aperture effect in accordance with the present invention.

Figure 1:
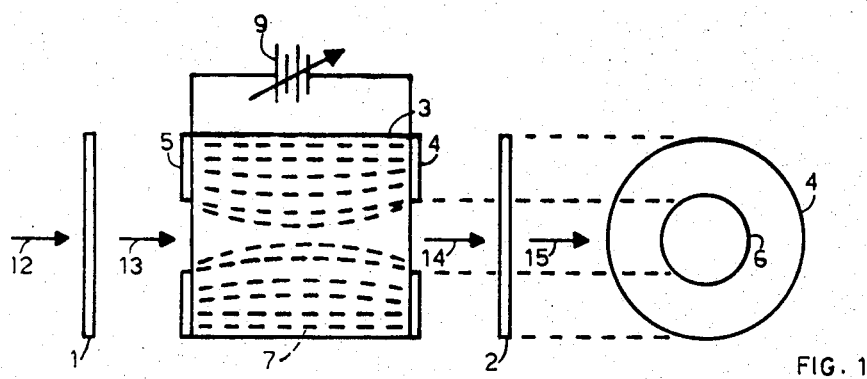
FIG. 1 is a side view of a thick Pockels Cell.

FIG. 1 is a side or cross-sectional view of a light intensity modulator employing a polarizer 1, a Pockels Cell 3 and an analyzer 2. The light controlling electrical potential is shown as variable battery 9 applied between annular electrodes 4 and 5 which are in intimate contact with the end surfaces of cell 3. A projection of electrode 4 is shown with central opening 6. The light passage first through polarizer 1, then through cell 3, and finally through analyzer 2 is represented by arrows 12, 13, 14 and 15 respectively. The voltage applied between electrodes 4 and 5 sets up an electric field 7 within the crystal of the cell. The strength of this field is in accordance with the potential difference between end electrodes 4 and 5 as determined by the instantaneous voltage of modulating voltage 9. Also the rotation of polarization of the light passing through the cell is in accordance with the electric field strength along the light path. With analyzer 2 positioned to pass maximum light with no applied voltage, the application of voltage by causing a progressive change in polarization of the light passing through the cell will in effect cause a progressive decrease and final substantial extinction of light 15 emerging from analyzer 2. This effect and structure is extremely useful as a high speed light modulator. By making the thickness of the crystal cell substantially greater (30 percent or more) than the diameter of hole 6 in the annular electrode, the effects of electric field fringing at the center of the cell at 8 is minimized so that the modulation of the light is substantially equalized over the aperture of the cell.

Figure 2:
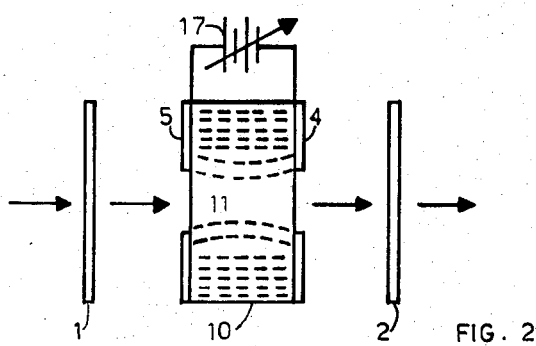
FIG. 2 is a side view of a thin Pockels Cell in accordance with the present invention.

FIG. 2 is a thin Pockels Cell 10 in which fringing at the center of the cell at 11 is enhanced to a point where the light emerging at 15 is controlled in beam size more than in apparent intensity. This is accomplished by making the cell 10 equal to or thinner than the diameter of the hole in the annular electrodes. The beam 15 emerging from analyzer 2 may be reduced to substantially zero over a controllable portion of its outer area while remaining at substantially full intensity at its center. In effect the beam size is controlled as shown by the projection of the beam diameters 20, 21 and 22 (FIG. 8) showing the effects on beam size of three increasing increments of applied potential 17. In effect a controllable beam diameter is provided. The device may be termed a controllable aperture.

Alternatively, analyzer 2 or polarizer 1 may be positioned to block the passage of light with no voltage applied. As voltage is applied, light will be passed in those areas of the crystal closest to the electrodes while the central area remains dark. In this instance the aperture will open from the outer edges inward. If maximum open voltage is applied at the start, operation, decreasing voltage will darken the central area first.

Figure 3:
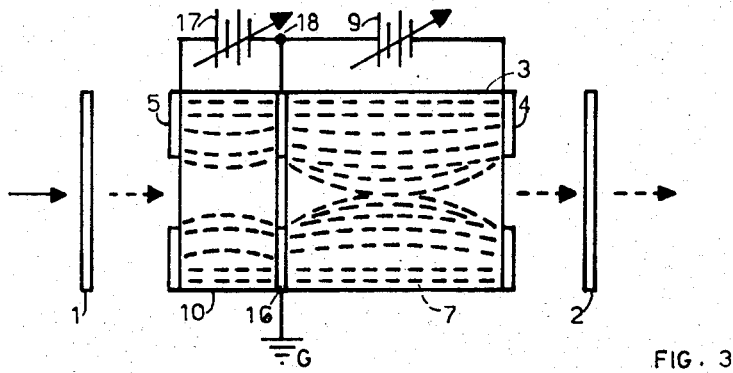

FIG. 3 shows a thick cell 3 combined with a thin cell 10 with outer annular electrodes 4 and 5 a common center electrode 16. With this arrangement the beam diameter may be controlled by variable potential 17 and beam intensity may be independently controlled by variable potential 9 where junction 18 is connected to common electrode 16. Simultaneous modulation of beam size and beam intensity may be attained by varying potentials 9 and 17 simultaneously.

FIG. 4 shows the combination of a thick cell 3 and a thin cell 10 where one annular electrode 5 is provided on the outer surface of the thin cell 10 and the common electrode 20 and the thick cell outer electrode 19 are transparent full coverage flat electrodes such as may be by evaporating a thin film of metal on the cell surface. This combination operates as described above in connection with FIG. 3. The thin cell 10, however, may be thinner in the configuration of FIG. 4 when compared to cell 10 FIG. 3 for comparable aperture size control.

The thick cell 3, may also be thinner in the configuration of FIG. 4 when compared to Cell 3 of FIG. 3 since there is no field fringing when uniform electrodes are used and hence no compensation, by increased crystal length, need be provided. Also, the effects of aperture size control and beam intensity control will be more definitely separated with the combination of FIG. 4.

FIG. 5 shows a combination of thick Cell 3 and thin Cell 10 wherein Cell 10 is provided with two annular electrodes 4 and 5 thick Cell 3 is provided with full coverage transparent electrodes 19 and 20. The adjacent electrodes 4 and 20 are joined to form the common electrode of the device.

FIG. 6 shows still another combination wherein thick Cell 3 has a full coverage electrode 19 on its outer surface; thin cell 10 has an annular electrode 5 on its outer surface; and the two Cells share a common annular electrode 4.

FIG. 7 shows a combination of thick and thin cells and annular and full coverage electrodes like those shown in FIG. 6 and described above, except in FIG. 7 the orientation of the two cells is reversed with the light entering the thick cell 3 first rather than the thin cell 10 first as shown in FIGS. 3, 4, 5, and 6. Thus, the devices are bilateral and the two cells may be oriented either way without departing from the spirit and scope of the invention.

The aperture control feature may also be used with other forms of modulators including devices operating in the transverse field mode, the Kerr effect, the Stark effect, etc.

FIG. 8 suggests how the aperture effect operates looking directly into the aperture. The annular electrode extends from the outer diameter 20 to the inner diameter 21. This inner diameter 21 defines the maximum apparent aperture. When voltage is applied, the apparent aperture is reduced to some lesser diameter as diameter 22.

Figure 9:
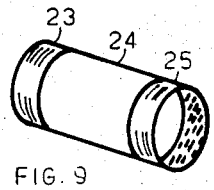
FIG. 9 is a cylindrical crystal with electron lens electrodes.

FIG. 9 is a cylindrical crystal body 24 having electron lens electrodes in the form of rings 23 and 25 at opposite ends of crystal body 24 and encircling the crystal lens near its ends. The modulating potentials as described above are applied between electrodes 23 and 24.

I claim:

1. In an aperture device for light control, the combination of;
   a Pockels cell;
   annular electrodes applied to said cell;
   a source of modulating voltage connected to said electrodes; a light polarizer on one side of said cell and a light analyzer on the other side of said cell; wherein the thickness of the cell is sufficiently small with respect to the diameter of the holes in said electrodes to provide a variable aperture effect responsive to said modulating voltage applied between said electrodes.

2. In a Pockels cell light modulating system the combination of;
   two Pockels cells mounted in optical axis alignment;
   annular electrodes applied to each cell for applying electrical potentials thereto in the direction of said optical axis;
   a light polarizer mounted in front of said cells in axial alignment therewith; a light analyzer mounted in back of said cells in axial alignment therewith; wherein one of said cells is thin enough with respect to the hole in said electrodes to provide a variable aperture effect in accordance with said applied electrical potential and the other of said cells is thick enough to provide intensity control in accordance with said applied electrical potential.

3. A Pockels cell combination as set forth in claim 2;
and including a source of a light beam directed to said cells.

4. A Pockels cell combination as set forth in claim 2;
wherein one of said cells is essentially composed of a crystal chosen from the group comprising: ammonium dihydrogen phosphate, potassium dihydrogen phosphate, and potassium dideutrium phosphate.

5. A Pockels cell combination as set forth in claim 2;
wherein said two cells are mounted in contact end-to-end with one of said electrodes common to said two cells.

* * * * *